May 13, 1924.
J. V. MACHESKY ET AL
ANTIFREEZE CONDENSER
Filed June 3, 1921
1,493,938
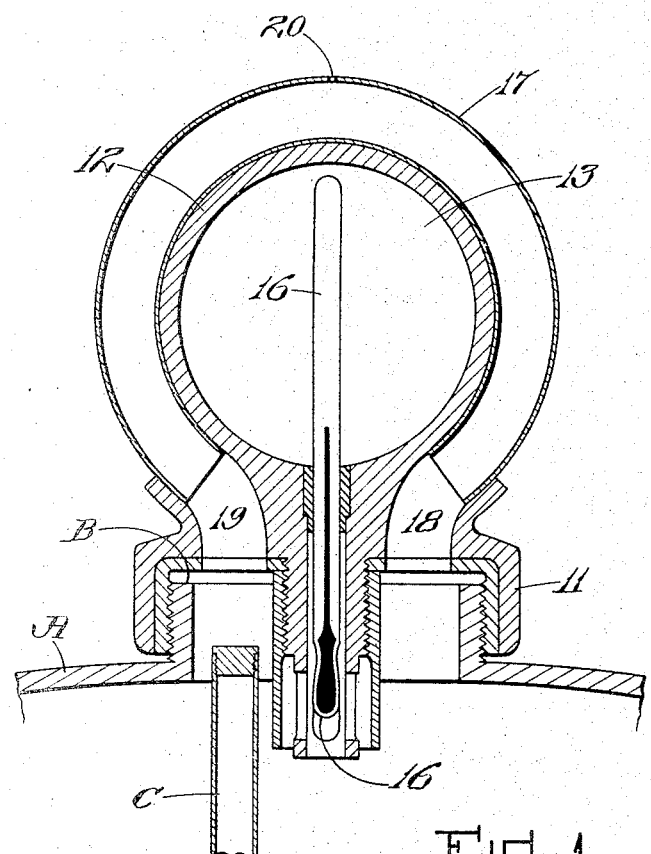
Fig_1_
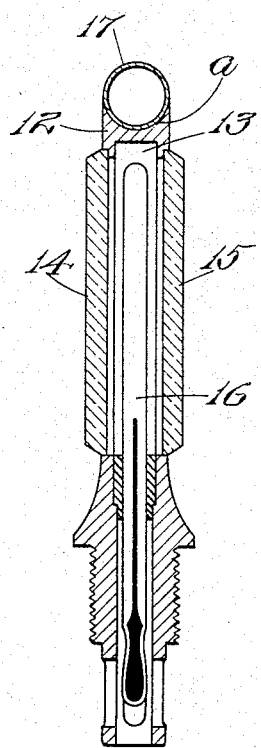
Fig_2_
INVENTORS:
John V. Machesky & Millard H. Tonney
by Macleod, Calver, Copeland & Dike
ATTYS.

Patented May 13, 1924.

1,493,938

UNITED STATES PATENT OFFICE.

JOHN V. MACHESKY AND MILLARD H. TONCRAY, OF DETROIT, MICHIGAN, ASSIGNORS TO ESSEX MOTORS, OF DETROIT, MICHIGAN, A CORPORATION OF MICHIGAN.

ANTIFREEZE CONDENSER.

Application filed June 3, 1921. Serial No. 474,869.

*To all whom it may concern:*

Be it known that we, JOHN V. MACHESKY and MILLARD H. TONCRAY, citizens of the United States, residing at Detroit, county of Wayne, State of Michigan, have invented a certain new and useful Improvement in Antifreeze Condensers, of which the following is a specification, reference being had therein to the accompanying drawings.

Our invention has for its object a combined anti-freeze condenser and temperature indicator for the cooling systems of internal combustion engines. The particular object of the invention is to provide a simple and effective device for condensing a highly volatile anti-freeze material and returning the same to the cooling fluid of an internal combustion engine so that the loss of the anti-freeze may be reduced to a minimum and practically eliminated.

Another object of the invention is to combine the anti-freeze condenser with a radiator cap and an ordinary temperature indicator of the type known in the trade as a motometer, so that there results a single, sightly and effective structure which can be applied as an accessory for cars already constructed or applied to new cars at relatively small expense. We find in practice that very little condensing surface is required to condense the small amount of anti-freeze which is volatilized at any one time and therefore the device or instrument embodying our present invention, while being hardly more expensive than the present temperature indicator, is sufficiently effective as a condenser for the anti-freeze. The device embodying our invention looks as well as the ordinary motometer and in fact can hardly be distinguished from it, but it performs very satisfactorily the functions both of the temperature indicator and an anti-freeze condenser. We are well aware that anti-freeze condensers have heretofore been employed and have been placed on the radiator cap, but we are not aware that anyone has combined such a condenser with a temperature indicator and a radiator cap to produce a single structure. The device embodying our invention can also, although performing the functions of both the meter and anti-freeze condenser, be manufactured for practically the same expense as an ordinary motometer.

The invention will be fully understood from the following description when taken in connection with the accompanying drawings, and the novel features thereof will be pointed out and clearly defined in the claims at the close of this specification.

In the drawings, Fig. 1 is a vertical section of the combined anti-freeze condenser and temperature indicator embodying our invention, the same being applied to the filler pipe of a radiator.

Fig. 2 is a transverse section of the device shown in Figure 1.

Referring now to the drawings, at A is shown the radiator, at B the filler pipe and at C the overflow pipe of an ordinary radiator. These parts form no part of our invention.

At 11 is shown the radiator cap and at 12 is shown the body of the device which forms one wall of the thermometer chamber 13 which is closed by circular disks of glass 14 and 15. At 16 is shown the thermometer tube which extends down into the space within the filler pipe B, the bulb of the thermometer being protected by a cap 21. The body of the device is grooved on the periphery, as shown at $a$, and in this groove is placed a thin-walled metal tube 17, the ends of which are fastened into the body and communicate through the openings 18 and 19 with the space within the filler pipe B. The structure is conveniently manufactured by curving the tube to proper shape and placing the same in suitable casting dies, after which the body is formed from molten metal by the well-known "die casting" process. When thus constructed, the tube is securely held in place by the metal which flows around the inner side of the tube and secures the ends of the tube in place. At 20 is shown a minute vent to relieve the pressure in the cooling system in case overheating takes place. In practice, we find that the existence of this vent, results in practically no loss of the cooling fluid under ordinary running conditions.

What we claim is:—

1. The combined anti-freeze condenser and temperature indicator for cooling systems of an internal combustion engine, which comprises a radiator cap, a thermometer chamber with a thermometer tube therein, the tube of said thermometer extending through the radiator cap into the space beneath, and a condensing tube arranged about the periphery of said thermometer chamber and adapted to communicate directly with the cooling system.

2. The combined anti-freeze condenser and temperature indicator for cooling systems of internal combustion engines, which comprises a radiator cap a disk-like chamber, a thermometer in said chamber the tube of said thermometer extending through the radiator cap into the space beneath and a condensing tube around the periphery of said chamber and communicating directly with the cooling system.

3. The combined anti-freeze condenser and temperature indicator for cooling systems of internal combustion engines, which comprises a radiator cap, a circular thermometer chamber mounted thereon having a thermometer tube therein the tube of said thermometer extending through the radiator cap into the space beneath and a condensing tube about the exterior of the thermometer chamber, the ends of which open through the radiator cap into the radiator.

4. The combined anti-freeze condenser and temperature indicator for cooling systems of internal combustion engines, which comprises a radiator cap and a circular thermometer chamber mounted thereon, said parts being cast integral with each other, the thermometer chamber being of disk-like form with sight openings therethrough, a thermometer tube in said thermometer chamber extending through the radiator cap into the space beneath and a condensing tube curved around the periphery of the thermometer chamber and having its ends cast in the radiator cap, the openings thereof extending through the radiator cap and communicating with the space beneath.

In testimony whereof we affix our signatures.

JOHN V. MACHESKY.
MILLARD H. TONCRAY.